United States Patent

Furlani et al.

[11] Patent Number: 6,034,457
[45] Date of Patent: *Mar. 7, 2000

[54] MAGNETIC DRIVE APPARATUS FOR WEB TRANSPORT

[75] Inventors: Edward P. Furlani, Lancaster; Dilip K. Chatterjee; Syamal K. Ghosh, both of Rochester, all of N.Y.

[73] Assignee: Eastman Kodak Company, Rochester, N.Y.

[*] Notice: This patent is subject to a terminal disclaimer.

[21] Appl. No.: 09/221,510

[22] Filed: Dec. 28, 1998

[51] Int. Cl.⁷ .................................................. H02K 49/00
[52] U.S. Cl. ............................. 310/103; 310/112; 492/8
[58] Field of Search .................................. 310/112, 103; 492/8; 100/917

[56] References Cited

U.S. PATENT DOCUMENTS

| | | | |
|---|---|---|---|
| 3,149,403 | 9/1964 | Aurich et al. | 492/8 |
| 3,150,419 | 9/1964 | Aurich | 19/272 |
| 3,168,760 | 2/1965 | Olcott | 19/272 |
| 5,155,401 | 10/1992 | Kanaya et al. | 310/89 |
| 5,216,557 | 6/1993 | Elsaesser et al. | 360/99.08 |
| 5,387,172 | 2/1995 | Hebenicht et al. | 492/50 |
| 5,569,967 | 10/1996 | Rode | 310/103 |
| 5,576,815 | 11/1996 | Teschendorf et al. | 399/249 |
| 5,782,177 | 7/1998 | Rindfleisch | 100/334 |
| 5,848,684 | 12/1998 | Furlani et al. | 198/805 |
| 5,861,692 | 1/1999 | Furlani et al. | 310/103 |
| 5,865,298 | 2/1999 | Furlani et al. | 198/805 |
| 5,896,873 | 4/1999 | Furlani et al. | 134/32 |
| 5,901,893 | 5/1999 | Furlani et al. | 226/181 |

OTHER PUBLICATIONS

T. Kenjo and S. Nagamori, *Permanent–Magnet and Brushless DC Motors*, 1985.

Primary Examiner—Thomas M. Dougherty
Assistant Examiner—Joseph Waks
Attorney, Agent, or Firm—Clyde E. Bailey, Sr.

[57] ABSTRACT

A magnetically driven apparatus useful, for instance, for conveying webs, utilizes magnetically coupled first and second rotatable elements and means for rotating one of the rotatable elements which causes the simultaneous synchronous rotation of the other rotatable element. Both first and second rotatable elements include a magnetic core, and a media bearing surface comprising a mixture of a polymeric matrix and a hard, inorganic particulate material wear and abrasion resistant layer surrounding the magnetic core. The means for rotating one of the rotatable elements includes a ferromagnetic stator member integrally associated with one of said first and second rotatable elements. The ferromagnetic stator member has a plurality of spatially separated pole teeth, wherein each of the pole teeth has an operably connected coil arranged for producing rotation of one of said first and second rotatable elements once the coil is energized.

7 Claims, 5 Drawing Sheets

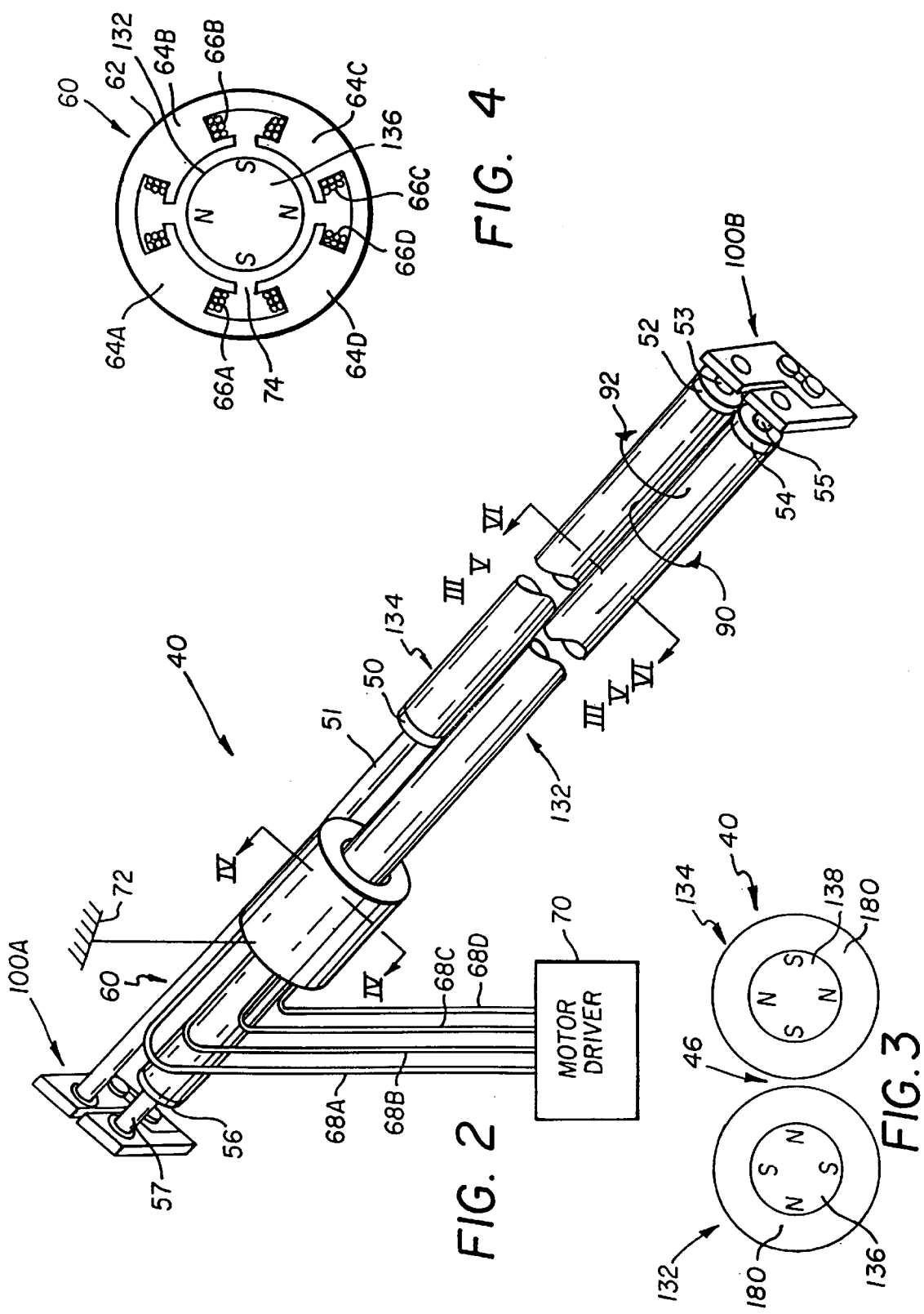

MAGNETIC DRIVE APPARATUS FOR WEB TRANSPORT

FIELD OF THE INVENTION

The invention relates to a coupling apparatus and, more particularly, the invention concerns a magnetically induced coupling and drive apparatus that utilizes a magnetically induced coupled wear and abrasion resistant roller assemblage useful for conveying photosensitive web of indeterminate length in chemically corrosive environments.

BACKGROUND OF THE INVENTION

In the production of media webs, particularly photosensitive film web, devices that employ mechanically coupled rotatable elements are widely used to convey the web of indeterminate length between a variety of processing stations. More particularly, such apparatus will normally guide and move the web through a processing sequence involving developer, fixer, washing, and drying bath stations which tend to expose the conveyance rotatable elements of the apparatus to corrosive materials. With mechanically coupled driven rotatable elements of the type presently used in web conveyance equipment, sensitive mechanical gears that synchronize the rotation of the rotatable elements and some sort of drive means, typically a motor, coupled to the rotatable elements for producing the desired rotation may be interrupted if exposed to harmful and deleterious materials.

Hence, it is well known that one major shortcoming of conventional mechanically coupled rotatable elements is that the excessive exposure of the mechanical elements to various corrosive materials will invariably result in degraded mechanical performance. As a consequence, the equipment, and therefore production, must be frequently interrupted for maintenance and parts replacement.

Moreover, during the processing of photosensitive web, experience indicates that the web will invariably tend to show signs of objectionable wear and abrasion as the performance of conventional mechanically coupled conveyance rotatable elements degrade during extensive and continuous exposure to corrosive materials. Hence, degraded rotatable elements and associated web conveyance elements tend to have an adverse effect on the quality of the costly photosensitive web product.

Another well recognized problem associated with conventional web conveyance equipment is that such equipment does not easily accommodate photosensitive film webs having a variety of thickness. In order to accommodate the processing of such film webs (each having a different thickness) enormous downtime and production cost sacrifices are realized so that required adjustments to a transfer nip separating the mechanically coupled rotatable elements can be made. Thus, photosensitive film web processing equipment that utilizes conventional mechanically coupled rotatable elements as a means of conveying the film web through various processing stations require costly and time consuming maintenance and adjustment.

Therefore, a need persists for a magnetically induced coupling and drive apparatus suitable for conveying photosensitive web materials in corrosive environments without the concerns that the equipment will require excessive and costly maintenance as well as will impart harmful defects to the film web. Moreover, there exists a need for such apparatus and method that easily accommodates adjustments for processing webs of different thickness.

SUMMARY OF THE INVENTION

It is, therefore, one object of the invention to provide a magnetically induced coupling and drive apparatus that is particularly suitable for conveying a media web in a corrosive environment without undergoing frequent maintenance and adjustments.

Another object of the invention is to provide a coupling and drive apparatus that employs magnetically driven and coupled rotatable elements capable of conveying a web of media in a corrosive environment.

It is another object of the invention to provide magnetically coupled rotatable elements that are wear and abrasion resistant.

It is a feature of the invention that a magnetically induced coupling and drive apparatus useful for conveying a media web incorporates a pair of conveyance rotatable elements each of which includes a corrosion resistant layer and a wear and abrasion resistant layer surrounding a magnetic core, the magnetic core providing means for magnetically coupling the pair of rotatable elements.

To solve one or more of the problems above, there is provided, in one aspect of the invention, a magnetic drive apparatus comprising magnetically coupled first and second rotatable elements. First rotatable element has a first magnetic core and a first media bearing surface at least partially surrounding the first magnetic core. The first media bearing surface comprises a mixture of a polymeric matrix and a hard, inorganic particulate material. Similarly, second rotatable element has a second magnetic core and a second media bearing surface at least partially surrounding the second magnetic core. The said second media bearing surface comprises a mixture of a polymeric matrix and a hard, inorganic particulate material.

Additionally, there is a frame for supporting the first rotatable element in a magnetic coupled relation with the second rotatable element. The first and second elements are supported in the frame and have a substantially uniform nip width therebetween for conveying a contacting web therethrough.

Moreover, means is provided for rotating one of the first and second rotatable elements. In our invention, a ferromagnetic stator member is integrally associated with one of the first and second rotatable elements. The stator member has a plurality of spatially separated pole teeth, each pole teeth having an operably connected coil arranged for producing rotation of one of the first and second rotatable elements. A source of energy is provided to energize the coils. Thus when the coils are energized, rotation of either one of the first and second rotatable elements causes rotation of the corresponding magnetic core in the rotated first or second rotatable element. Because the rollers are magnetically coupled via the respective magnetic cores, the other roller will simultaneously and synchronously rotate.

It is, therefore, an advantageous effect of the present invention that the magnetic induced coupling and drive apparatus is useful for conveying a web, such as photosensitive film web, in a corrosive environment without degradation of the conveyance elements. A further advantage of the present invention is that the conveyance elements can be easily adjusted to accommodate webs of different thicknesses. An additional advantage of the present invention is that a preselected one of the magnetically coupled elements has the dual function of being an integral part of the drive mechanism thereby reducing the number of parts and thus cost of the apparatus and associated system. A further advantage of the invention is that the media bearing surface is sufficiently compliant to accommodate media of varying thickness. Further, the conveyance apparatus of the invention offers the advantage of providing sufficient friction to enable the movement of abrasive media between independent processing stations.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein:

FIG. 2 is a perspective view of the web transport apparatus of the present invention;

FIG. 3 is a sectional view of the transport rollers taken along line III—III of FIG. 2;

FIG. 4 is a sectional view of a motor drive mechanism taken along line IV—IV of FIG. 2;

To facilitate understanding, identical reference numerals have been used, where possible, to designate identical elements that are common to the figures.

DETAILED DESCRIPTION OF THE INVENTION

Figure 1:
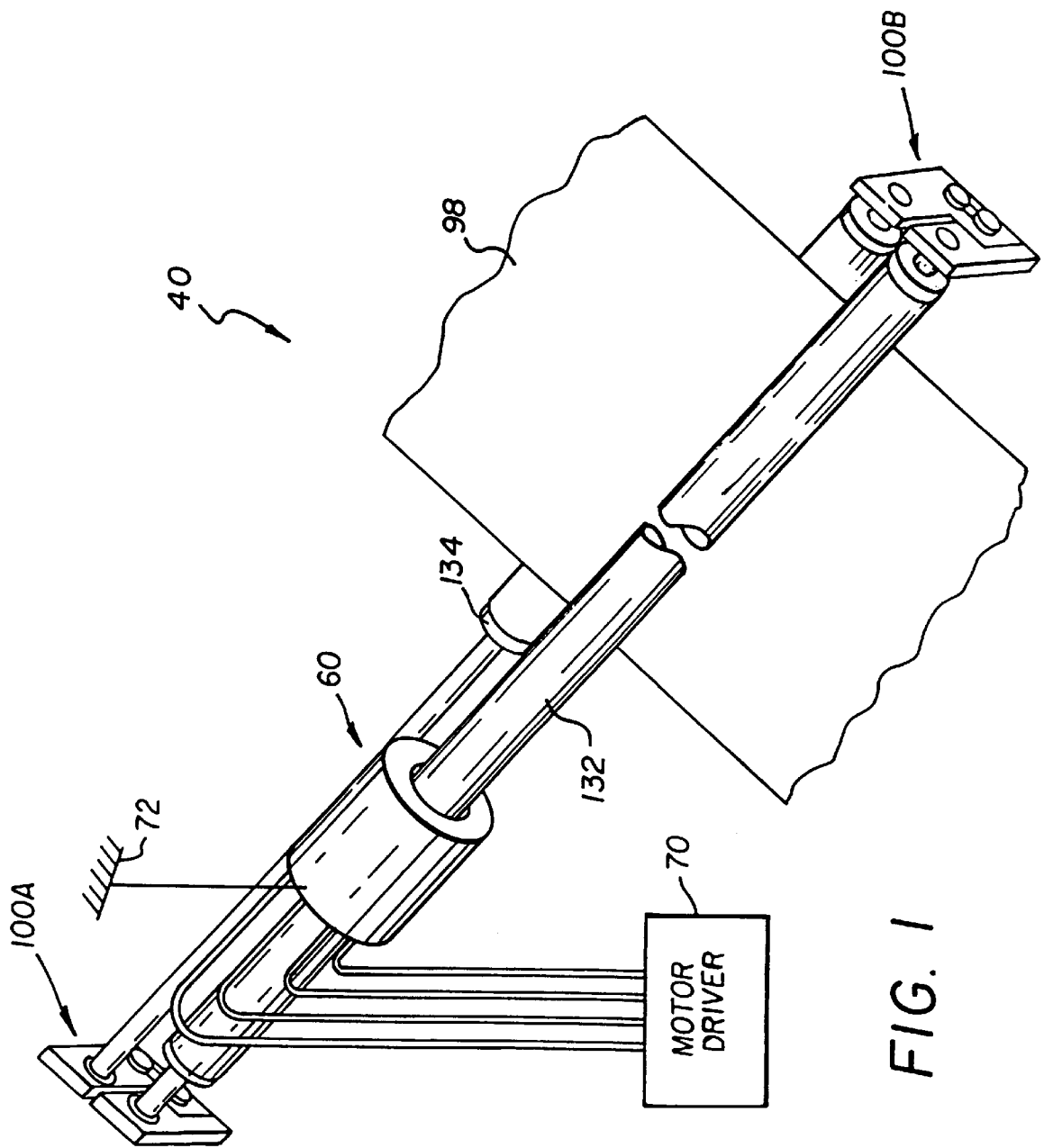
FIG. 1 is a perspective view of a web being transported by the web transport apparatus of the invention.

Referring to FIGS. 1, 2, and 3 perspective and sectional views are shown of a web transport apparatus 40 of the invention. The web transport apparatus 40 for conveying an abrasive web 98, includes closely spaced first and second rotatable elements 132, 134. It is within the contemplation of the invention that any one of the first and second rotatable elements 132, 134 has a media bearing surface coated with an inorganic particulate in a polymeric matrix. For clarity, the media bearing surface (designated 180 in FIG. 5 or 190 in FIG. 6) is defined as the outermost surface of the rotatable element on which the web 98 rides as it is being conveyed through the transport nip or close spacing 46 between the rotatable elements 132, 134. Skilled artisans will appreciate that while both rotatable elements 132, 134 have media bearing surfaces 180, 190, the media bearing surfaces 180, 190 need not include the entire surface area of the rotatable element, but only the active portion of the outermost surface minimally required to promote continuous movement of the abrasive web 98 through the nip 46. It is further within the contemplation of the invention that a plurality of cooperating conveyance rotatable elements (not shown) may have coated media bearing surfaces of the type described herein. Alternatively, the media bearing surfaces 180, 190 may include a thin inorganic coating, as described below. Thus, a media bearing surface 180, 190 having a polymeric/inorganic particulate composite coating (or alternatively, a thin inorganic coating) was selected because it provides sufficient compliancy to accommodate abrasive media of varying thickness. Importantly, as indicated, media bearing surfaces 180, 190 also provide sufficient friction to enable continuous movement of the abrasive web 98 as it is conveyed between the nip 46 of first and second rotatable elements 132, 134. Skilled artisans will appreciate that while any one of rotatable elements 132, 134 (shown in FIG. 2) may have media bearing surfaces 180, 190 comprising polymeric/inorganic particulate coating or a thin inorganic coating, it is within the contemplation of the invention that both rotatable elements 132, 134 (shown in FIGS. 2 and 3), or a portion of any of the media bearing coated surfaces 180, 190 (shown in FIGS. 5 and 6, respectively) may comprise any one or both of our preferred wear and abrasion resistant coatings.

Referring specifically to FIG. 2, the web transport apparatus 40 broadly defined, includes a first rotatable element or roller 132 magnetically coupled to a second rotatable element or roller 134. Magnetic drive means 60 (described below) which induces the magnetic coupling of the first and second rotatable elements 132, 134 is uniquely integrally associated with one of the first and second rotatable elements 132, 134 in a manner described more fully below. In a preferred embodiment, magnetic drive means 60 is operably associated with first rotatable element 132. Alternatively, magnetic drive means 60 may be integrally associated with second rotatable element 134 with similar results. Frame members 100A, 100B support the first and second rotatable elements 132, 134 in a magnetically coupled relation, described below.

Referring again to FIG. 2, magnetic drive means 60, more particularly, is fixedly attached to a rigid support member 72. In this way, magnetic drive means 60 is held stationary against any movement relative to the second rotatable element 134. Practically any suitable means of attaching magnetic drive means 60 to support member 72 may be used, e.g., bolting. A motor driver 70 (see for instance various motor drivers described in "Permanent Magnets and Brushless DC Motors," by T. Kenjo and S. Nagamori, Oxford University Press, 1984) is operably connected to magnetic drive means 60 via a plurality of conductors 68A, 68B, 68C, and 68D. Conductors 68A, 68B, 68C, and 68 D provide electrical connection between the motor driver 70 and magnetic drive means 60. Therefore, when current is provided from the motor driver 70 it flows through conductors 68A, 68B, 68C, and 68D into ferromagnetic stator member 62 (shown in FIG. 4) of magnetic drive means 60 that drives one of the rotatable elements 132, 134.

As shown in FIG. 2, first and second rotatable elements, 132, 134 are mounted for rotational support in opposing frame members 100A and 100B. By precisely positioning rotatable elements 132, 134 in frame members 100A, 100B, a substantially uniform nip 46 (shown in FIG. 3) or spacing is formed between the mounted first and second rotatable elements 132, 134 through which a contacting web 98 can be conveyed (FIG. 1).

Turning to FIG. 3, first and second rotatable elements 132, 134 are shown in a sectional view taken along line III—III of FIG. 2. As depicted, first and second rotatable elements 132, 134 are spaced slightly apart in frame member 100A forming nip 46 between them so as to accommodate a web of predetermined thickness.

Figure 5:
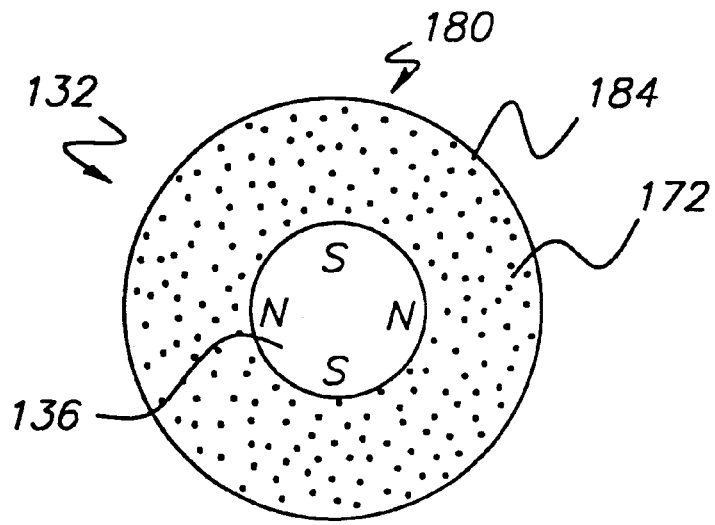
FIG. 5 is a sectional view taken along line V—V of FIG. 2 showing a wear and abrasion resistant coating on the outer surface of a roller.

Referring to FIGS. 3 and 5, it is important to our invention that first and second rotatable elements 132, 134 are similarly constructed. In our preferred embodiment of the invention, first and second rotatable elements 132, 134 have first and second magnetic cores 136, 138, respectively. First and second magnetic cores 136, 138 are preferably made from a non rare-earth permanent magnet material such as aluminum-nickel-cobalt, barium-ferrite, copper-nickel-iron alloy, or iron-cobalt-molybdenum alloy. Most preferred of the non rare-earth materials is aluminum-nickel-cobalt.

Alternatively, first and second magnetic cores 136, 138 may also be made of a rare-earth material such as neodymium-iron-boron, samarium-cobalt, or a mixture thereof. In this instance, the most preferred material is neodymium-iron-boron manufactured by Magnaquench, Inc., of Indiana.

Referring to FIG. 3, it is also important to our invention that first and second magnetic cores 136, 138 are polarized with a plurality of radially disposed surface poles of alternating polarity around their circumferences. This arrangement of surface poles is required so that a select one of the magnetic cores 136, 138 will function as a motor rotor when the selected magnetic core 136, 138 is in operable relations with magnetic drive 60. Further, the arrangement of surface poles is required so that magnetic core 136 interacts with magnetic core 138 thereby providing a magnetic coupling between the magnetic cores 136, 138.

Referring now to FIG. 4, magnetic drive means 60 is illustrated in a sectional view taken along line IV—IV in FIG. 3. Magnetic drive means 60 comprises a ferromagnetic stator member 62 with stator pole teeth 64A, 64B, 64C, and 64D and coils 66A, 66B, 66C, and 66D. The ferromagnetic stator member 62 is fixedly attached to support member 72 (FIG. 2) which holds it stationary. The coils 66A, 66B, 66C, and 66D are wrapped around the stator pole teeth 64A, 64B, 64C, and 64D, respectively. Motor driver 70 supplies power to the coils 66A, 66B, 66C, and 66D through conductors 68A, 68B, 68C, and 68D, respectively, as shown in FIGS. 1 and 2.

As depicted in FIG. 4, first roller 132 passes through a central opening 74 in the ferromagnetic stator member 62. The first magnetic core 136 of first roller 132 functions as the motor rotor, as shown. To cause rotation of the first roller 132, motor driver 70 supplies current through the conductors 68A, 68B, 68C, and 68D to the coils 66A, 66B, 66C, and 66D, respectively, in a synchronous fashion thereby creating a magnetic field in the ferromagnetic stator member 62. This magnetic field, in turn, produces a corresponding magnetic field between the neighboring ferromagnetic stator teeth 64A, 64B, 64C, and 64D in a synchronous fashion. Interactions between these magnetic fields produces rotation of the first magnetic core 136 of first rotatable element 132 in a manner that is well known in the art. (See for example "Permanent Magnets and Brushless DC Motors," by T. Kenjo and S. Nagamori, Oxford University Press, 1984.) It should be clear to those skilled in the art that an important advantage of this integral relationship between stator member 62 and first roller 132 (shown clearly in FIG. 4) is that apparatus 40, and any associated equipment employing the apparatus 40, requires significantly fewer elements and, therefore, is considerably easier to assemble and more cost effective to manufacture.

Turning now to FIG. 5, a sectional view is shown of transport rotatable element 132 taken along line V—V of FIG. 2 (transport roller 134 is of similar construction). Transport roller 132 has an abrasive media bearing surface 180. Coating 184 is deposited on polymeric substrate 172, which is supported on the magnetic core 136. In the preferred embodiment, media bearing surface 180 comprises a composite coating. While there are a range of composite coatings within the contemplation of the invention, a composite coating containing polyurethane binder mixed with hard inorganic particulates is most preferred, as described below. Other embodiments may include polymeric binders, such as polyvinyl alcohol, polyalkylene glycols, polyacrylates, and polymethacrylates.

Referring again to FIG. 5, the relatively harder shell or coating 184 of the media bearing surface 180, applied on a polymeric substrate 172, comprises primarily inorganic particles selected from the group comprising metal oxides, metal carbides, metal nitrides, and metal borides. More particularly, such metal composites include silica, titania, zirconia, alumina, silicon carbide, silicon nitride, titanium nitride, titanium diboride, zirconium boride, and a mixture thereof.

With further reference to FIG. 5, polymeric substrate 172 is preferably made of polyurethane. Polymeric substrate 172 may also be made from other materials with similar results including synthetic rubber, polyurethane, or a mixture thereof.

Preferably, coating or shell 184, includes one or more polymeric binder materials to adhere or coalesce the inorganic particles in the coating solid form. These polymeric binders are not cross-linkable, but provide a physical bonding among the inorganic particles as well as adhesion to the polymeric substrate 172. Such binder materials include, but are not limited to, polyvinyl alcohol, polyalkylene glycols, polyacrylates, polymethacrylates, and polyurethane. The thickness of the coating or shell 184 is preferably between about 0.25 inch and about 0.001 inch, preferred being 0.01 inches. Further, the Rockwell hardness of coating 184 at 75° F. is preferably in the range between Shore hardness D40 and D75.

For best results, inorganic particle concentration of the shell or coating 184 is preferably in the range of 50 to 95% by weight, most preferably in the range of between 70 to 85% by weight.

Figure 6:
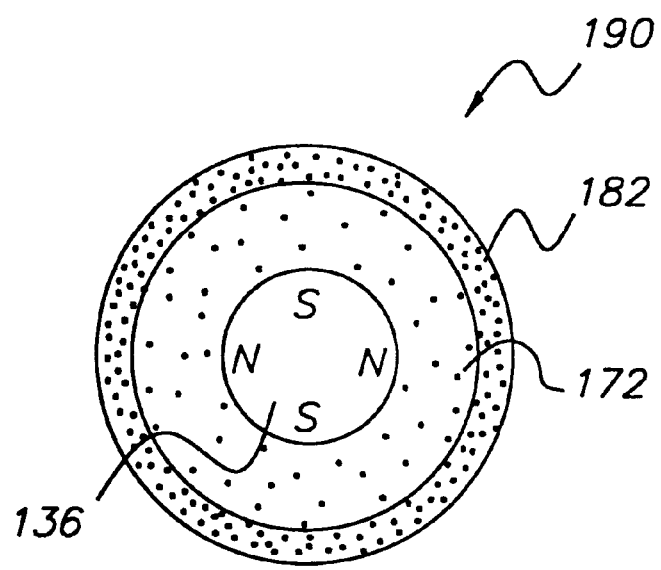
FIG. 6 is a sectional view taken along line VI—VI of FIG. 3 showing wear and abrasion resistant particles embedded in a transport roller.

Referring now to FIG. 6, an alternative embodiment, transport roller assemblage 132 (FIG. 3) of web transport apparatus 40 may include at least one of the first and second rotatable elements 132, 134 having a media bearing surface comprising a harder (compared to the coating described above) and semi-compliant thin coating 182 applied over a semi-compliant polymeric/inorganic particulate composite substrate 172. The relatively harder shell 182 is selected from the group comprising metal oxides, metal carbides, metal nitrides, and metal borides. More particularly, such metal composites include such materials as silica, titania, zirconia, alumina, silicon carbide, silicon nitride, titanium nitride, titanium diboride, zirconium boride, and a mixture thereof. The thin coating 182 may be applied by physical vapor deposition or thermal spray coating. Alternatively, the thin coating 182 may be accomplished by dip coating or spin coating of inorganic sol-gel particles. The sol-gel coating is performed by selecting one or more colloids of titania, zirconia, alumina, silica, or a transition metal oxide. Such colloids are obtained from hydroxytitanates, hydroxyzirconates, hydroxyaluminates, or hydroxysilicates. Stable dispersions of such materials can be purchased from various commercial sources including DuPont Company. The colloidal dispersion comprising about 5 weight % solids are used and applied onto the substrate by either spin coating or dip coating. The coating is then allowed to dry at about 100° C. for about 1 to 2 hours. Preferably, the thickness of the coating or shell 182 is between about 0.001 inch and about 0.0001 inches. Further, it is preferred that the hardness of the shell 182 be in the range of about Rockwell C30 to about Rockwell C60.

Referring again to FIG. 6, media bearing surface 190 comprises a polymeric/inorganic particulate composite substrate 182 which is formed by mixing inorganic particulate materials, preferably ceramic particles such as alumina, zirconia, silicon carbide, silicon nitride, and the like, with an organic polymeric slurry comprising rubber, silicone, or polyurethane. The mixture is then cast on the magnetic core 136. The mixture contains preferably at least about 5 weight % inorganic particles and must not exceed about 50 weight % so that the hardness of the composite (polymer+inorganic particles) roller does not exceed Shore hardness A 70, and preferably lies within about 60 and about 70.

Referring again to FIGS. 2 and 4, first and second rotatable elements, 132, 134 each have end support members 50, 52 and 54, 56, respectively, which are shrunk fit onto end portions of the first and second rotatable elements 132, 134, as described below. The shaft portions 51, 53 and 55, 57 of end support members 50, 52 and 54, 56, respectively, pass through respective sleeve bearings in frame members 100A and 100B. Thus, first and second rotatable elements 132, 134 are free to rotate about their respective longitudinal axis. When magnetic drive means 60 is energized by the motor driver 70, as described above, it causes rotation of the second roller 32 which, in turn, causes synchronized rotation of the first roller 132 due to their mutual magnetic coupling (see rotation arrows 90, 92). The end support members 50, 52 and 54, 56 are made from AISI 316 stainless steel, wherein the end shaft portions 51, 53 and 55, 57 are electroplated with Teflon™ impregnated nickel so as to reduce the coefficient of friction.

Figure 7:
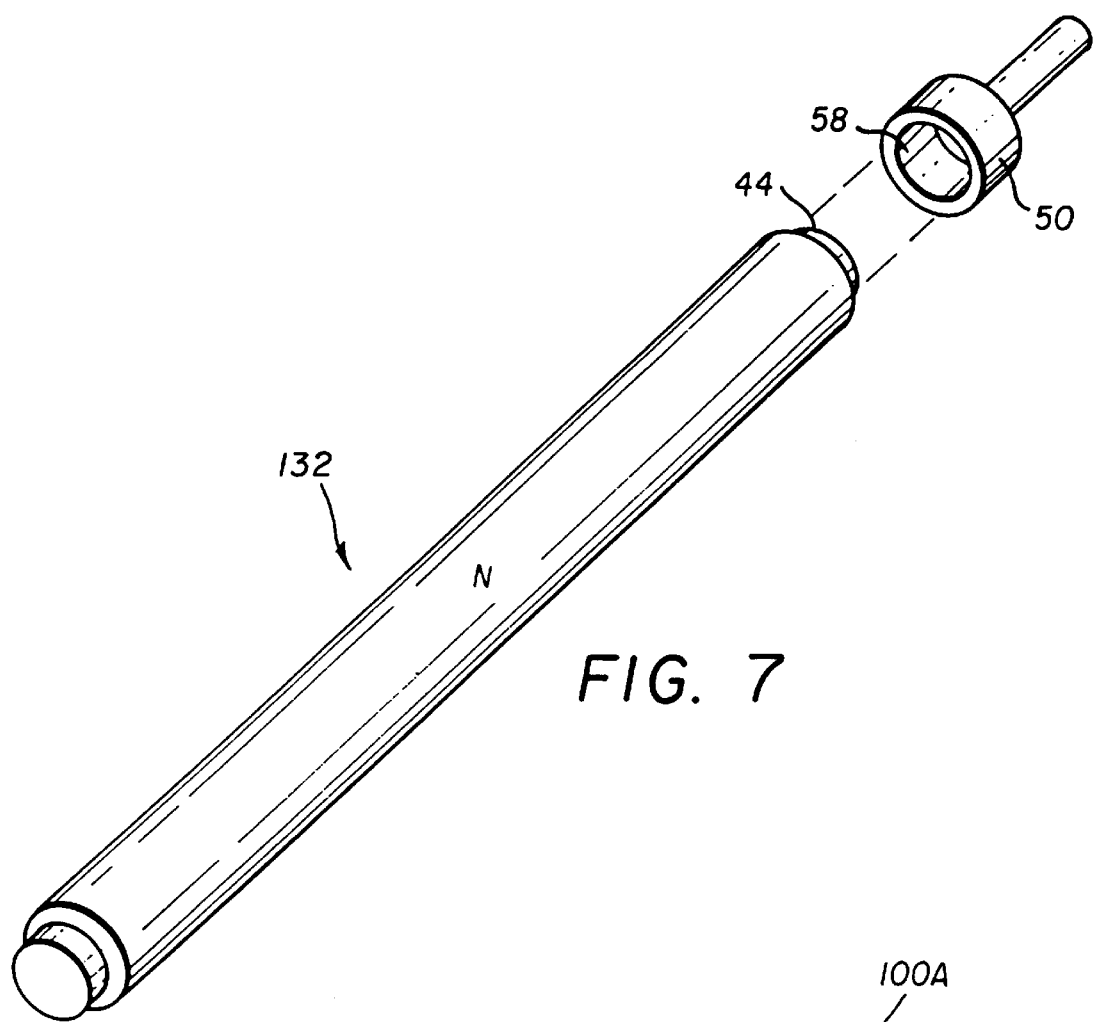
FIG. 7 is a perspective view of a transport roller and end shaft member.

Referring to FIG. 7, a perspective view of the first roller 132 and end support member 50 is depicted. End support member 50 has a cavity 58 for receiving the tapered end 44 of the first roller 132. The end support member 50 is fixedly attached to the end of the first roller 132 by shrink fitting or alternatively by press fitting. The other end support members 52, 54, 56, which are identical to end support member 50, are fixedly attached in a similar fashion to a respective end of the first and second rotatable elements 132, 134, as shown in FIG. 2.

Figure 8:
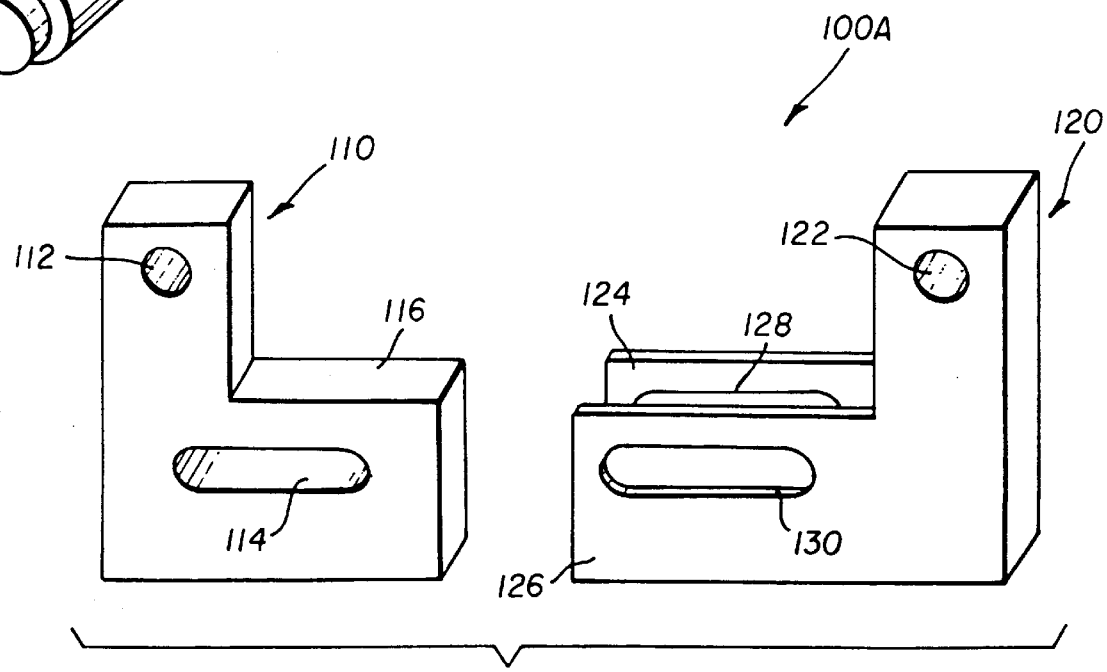
FIG. 8 is a perspective view of the frame.

Depicted in FIG. 8, a perspective view of frame member 100A is illustrated. Frame member 100A comprises a bearing bracket component 110 with a through-hole 112, insert receiving hole 114 and wall 116. Further, frame member 100A has a bearing bracket component 120 with a through-hole 122 and walls 124, 126 with insert receiving holes 128, 130, respectively.

Figure 9:
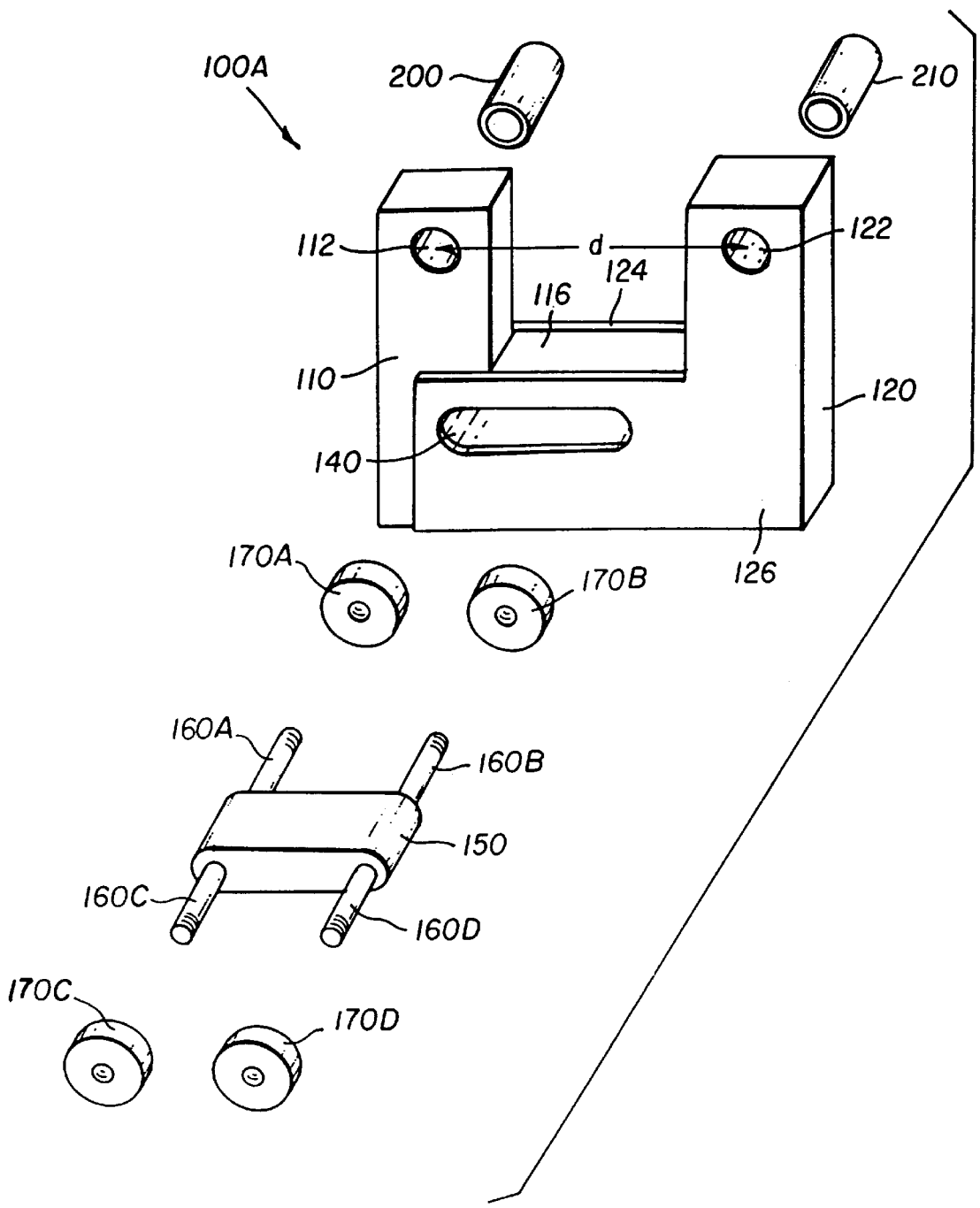
FIG. 9 is an exploded perspective view of the frame assembly with sleeve bearings and threaded insert.

Turning now to FIG. 9, an exploded view of a partially assembled frame member 100A is depicted. As illustrated, bearing bracket component 110 abuts bearing bracket component 120 such that wall 116 of bearing bracket component 110 is between walls 124, 126 of bearing bracket component 120 with insert receiving hole 114 aligned with insert receiving holes 128, 130 forming insert receiving hole 140. Distance (d) between centerlines passing through through-hole 112 of bearing bracket component 110 and through-hole 122 of bearing bracket component 120 is determined by the width of insert 150 which is inserted into the insert hole 140. Thus, insert members of different widths can be used to vary the distance (d) between through-holes 112, 122. The insert member 150 with threaded portions 160A, 160B, 160C, 160D is fixedly attached to assembled frame member 100A. Specifically, insert member 150 is inserted into receiving hole 140 and fixedly attached to frame member 100A by screwing bolts 170A, 170B, 170C, 170D onto threaded portions 160A, 160B, 160C, 160D, respectively. Bearing sleeves 200 and 210 are shrunk fit into through-holes 112, 122, respectively.

The invention has been described with reference to a preferred embodiment; However, it will be appreciated that variations and modifications can be effected by a person of ordinary skill in the art without departing from the scope of the invention.

What is claimed is:

1. A magnetic drive apparatus for web transport comprising:

a frame;

a first rotatable element and a second rotatable element each supported in said frame in a magnetically coupled, spaced apart relations forming a substantially uniform nip therebetween for conveying a contacting web therethrough;

wherein said first rotatable element comprises a first magnetic core and a first media bearing surface at least partially surrounding said first magnetic core, said first media bearing surface comprising a mixture of a polymeric matrix and a hard, inorganic particulate material, said first rotatable element further comprising integral thereto a ferromagnetic stator member operably fitted about a circumference of the first rotatable element, said ferromagnetic stator member having a plurality of spatially separated pole teeth, each of said pole teeth having an operably connected coil arranged for producing rotation of said first rotatable element, said coils being energized by a source of energy, wherein rotation of said first rotatable element causes rotation of second magnetic core, which rotation simultaneously causes synchronous rotation of said second rotatable element; and, wherein said second rotatable element comprises a second magnetic core and a second media bearing surface at least partially surrounding said second magnetic core, said second media bearing surface comprising a mixture of a polymeric matrix and a hard, inorganic particulate material.

2. The apparatus recited in claim 1 wherein said ferromagnetic stator member comprises an opening for receiving end portion of one of said first and second rotatable elements, said ferromagnetic stator member being fixed against movement relative to said one of said first and second rotatable elements.

3. The apparatus recited in claim 1, wherein said inorganic particulate material is selected from the group consisting of:

(a) alumina;

(b) silicon carbide;

(c) silicon nitride;

(d) zirconia;

(e) titania; and (f) mixture thereof.

4. The apparatus recited in claim 1, wherein said polymeric matrix is selected from the group consisting of:

(a) synthetic rubber;

(b) silicone;

(c) polyurethane; and (d) mixture thereof.

5. The apparatus recited in claim 1, wherein said inorganic particulate in either of said first and second rotatable elements is in said mixture at a concentration in a range of between about 5% by weight and 50% by weight.

6. The apparatus recited in claim 5 wherein said inorganic particulate has a concentration of 20 weight %.

7. The apparatus recited in claim 1, wherein means are provided for adjusting the nip, said means comprising a pair of slidably adjustable bearing brackets arranged for rotatably supporting either one of said first and second rotatable elements.

* * * * *